(12) United States Patent
Murakami et al.

(10) Patent No.: US 8,570,539 B2
(45) Date of Patent: Oct. 29, 2013

(54) IMAGE PROCESSING DEVICE FOR DETERMINING WHETHER OR NOT AN APPLICATION IS EXECUTABLE BASED ON WHETHER OR NOT AN API IS AVAILABLE AND A COMPUTER-READABLE MEDIUM STORING A PROGRAM

(75) Inventors: Masakazu Murakami, Itami (JP); Mitsuzo Iwaki, Osaka (JP); Tomonari Yoshimura, Kyoto (JP); Okihisa Yoshida, Amagasaki (JP); Takahiro Ikeda, Tondabayashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1521 days.

(21) Appl. No.: 11/844,719

(22) Filed: Aug. 24, 2007

(65) Prior Publication Data

US 2008/0100610 A1    May 1, 2008

(30) Foreign Application Priority Data

Oct. 26, 2006   (JP) .................................. 2006-290573

(51) Int. Cl.
    *G06F 3/12*      (2006.01)
    *G06F 17/00*     (2006.01)
(52) U.S. Cl.
    USPC ........................ 358/1.13; 358/1.14; 345/418
(58) Field of Classification Search
    USPC ....................................................... 358/1.13
    See application file for complete search history.

(56) References Cited

U.S. PATENT DOCUMENTS

| 8,144,346 | B2 * | 3/2012 | Sakikawa | 358/1.13 |
| 2003/0066027 | A1 * | 4/2003 | Nakagiri | 715/500 |
| 2004/0141203 | A1 * | 7/2004 | Honma | 358/1.15 |
| 2005/0271410 | A1 * | 12/2005 | Namizuka et al. | 399/75 |
| 2006/0072551 | A1 * | 4/2006 | Aoyama et al. | 370/352 |
| 2006/0082801 | A1 * | 4/2006 | Ohishi | 358/1.13 |
| 2006/0287962 | A1 * | 12/2006 | Oosawa | 705/59 |
| 2007/0103710 | A1 * | 5/2007 | Yagita | 358/1.13 |
| 2008/0007758 | A1 * | 1/2008 | Miyashita | 358/1.14 |
| 2009/0046318 | A1 * | 2/2009 | Sakikawa | 358/1.15 |

FOREIGN PATENT DOCUMENTS

| JP | 11-134136 |   | 5/1999 |
| JP | 2001-243699 | * | 9/2001 |
| JP | 2001-273181 | A | 10/2001 |
| JP | 2005-094079 | A | 4/2005 |
| JP | 2005-258924 | A | 9/2005 |
| JP | 2006-005911 |   | 1/2006 |
| JP | 2006-107081 |   | 4/2006 |
| JP | 2006-148876 |   | 6/2006 |

* cited by examiner

*Primary Examiner* — Gabriel Garcia
*Assistant Examiner* — Pawandeep Dhingra
(74) *Attorney, Agent, or Firm* — Buchanan Ingersoll & Rooney PC (57) ABSTRACT

Referring to contents of a user information storage, an MFP information storage, an API information storage and the like, whether or not an API is available is determined, an unexecutable function of an application due to unavailability of the API is determined, and a display way for displaying a list of applications on a display is switched

12 Claims, 12 Drawing Sheets

| UNEXECUTABLE API | PARAM | REASON |
|---|---|---|
| CreateJob | Print | NO. OF PRINTED SHEETS REACHED UPPER LIMIT |
| SetUserData |  | NO AUTHORITY |
| ⋮ | ⋮ | ⋮ |

| UNEXECUTABLE FUNCTION | UNEXECUTABLE API | REASON |
|---|---|---|
| ACCOUNTING TABLE PRINTING | CreateJob (Print) | NO. OF PRINTED SHEETS REACHED UPPER LIMIT |
| HOME PAGE PRINTING | CreateJob (Print) | NO. OF PRINTED SHEETS REACHED UPPER LIMIT |
| ⋮ | ⋮ | ⋮ |

| APPLICATION NAME | FILE SIZE | VERSION | COMPANY NAME | API LIST |
|---|---|---|---|---|
| ACCOUNTING TABLE MANAGEMENT | 40M | 1.0 | ACCOUNTING TABLE MANAGEMENT CO. | ACC.XML |
| HOME PAGE PRINTING | 5M | 2.0 | SOFTWARE DEVELOPMENT CO. | HPPRT.XML |
| BOOKSHELF | 4K | 5.4 | ABC CO. | BOOK.XML |
| ... | ... | ... | ... | ... |

FIG.5

```
<Application>
  <Name>ACCOUNTING TABLE MANAGEMENT</Name>
  <Function>
    <Name>ACCOUNTING TABLE PRINTING</Name>
    <Api>
      <Name>CreateJob</Name>
      <Param>
        <JobType>Print</JobType>
        <Color>True</Color>
      </Param>
    </Api>
    <Api>
      .
      .
    </Api>
  </Function>
  <Function>
    <Name>ACCOUNTING TABLE REGISTRATION</Name>
    <Api>
      <Name>CreateJob</Name>
      <Param>
        <JobType>Scan</JobType>
        <Color>True</Color>
        <FileType>pdf</FileType>
        <Encryption>Off</Encryption>
      </Param>
    </Api>
    <Api>
      .
      .
    </Api>
  </Function>
</Application>
```

FIG.6

| USER NO. | DEPT. | NAME | AUTHORITY INFORMATION ||||| |
|---|---|---|---|---|---|---|---|
| | | | COPYING | SCANNING | FAX | ACTUAL NO. OF PRINTED SHEETS /PERMITTED NO. OF SHEETS TO BE PRINTED | ADMINISTRATOR AUTHORITY |
| 1 | 1111 | DAVID | Y | N | Y | 2300/5000 | N |
| 2 | 1234 | MICHAEL | N | N | Y | 1000/1000 | N |
| 3 | 1245 | JULIE | Y | Y | Y | 3500/10000 | Y |
| ... | ... | ... | ... | ... | ... | ... | ... |

FIG.7A

| ITEM | SETTING |
| --- | --- |
| SECURITY STRENGTHENING MODE | OFF |
| COLOR PROHIBITION | OFF |
| FTP | ON |
| PUBLIC USER'S UTILIZATION | PROHIBITED |
| ADDRESS BOOK SETTING | PROHIBITED |
| ⋮ | ⋮ |

FIG.7B

| ITEM | SETTING |
| --- | --- |
| BLACK TONER | EMPTY |
| CYAN TONER | FULL |
| PRINTER UNIT | READY |
| SCANNER UNIT | READY |
| HARD DISK | READY |
| ⋮ | ⋮ |

FIG.8A

| API NAME | RELATED FUNCTIONS | | | | |
|---|---|---|---|---|---|
| | UPPER LIMIT MANAGEMENT | AUTHENTICATION | COLOR VALIDITY/ INVALIDITY | TRANSMISSION DESTINATION LIMITATION | SECURITY STRENGTHENING |
| CreateJob | U | Y | Y | N | MS |
| SetUserData | N | Y | N | N | MS |
| CreateBox | N | Y | N | N | MS |
| ... | | | | | |

FIG.8B

| API NAME | RELATED FUNCTIONS | | |
|---|---|---|---|
| | ENGINE STATE | SCANNER STATE | HDD STATE |
| CreateJob | Y | N | Y |
| SetUserData | N | N | N |
| CreateBox | N | Y | Y |
| ... | | | |

| UNEXECUTABLE API | PARAM | REASON |
|---|---|---|
| CreateJob | Print | NO. OF PRINTED SHEETS REACHED UPPER LIMIT |
| SetUserData | | NO AUTHORITY |
| ⋮ | ⋮ | ⋮ |

FIG.11B

| UNEXECUTABLE FUNCTION | UNEXECUTABLE API | REASON |
|---|---|---|
| ACCOUNTING TABLE PRINTING | CreateJob (Print) | NO. OF PRINTED SHEETS REACHED UPPER LIMIT |
| HOME PAGE PRINTING | CreateJob (Print) | NO. OF PRINTED SHEETS REACHED UPPER LIMIT |
| ⋮ | ⋮ | ⋮ |

IMAGE PROCESSING DEVICE FOR DETERMINING WHETHER OR NOT AN APPLICATION IS EXECUTABLE BASED ON WHETHER OR NOT AN API IS AVAILABLE AND A COMPUTER-READABLE MEDIUM STORING A PROGRAM

This application is based on Japanese Patent Application No. 2006-290573 filed with the Japan Patent Office on Oct. 26, 2006, the entire content of which is hereby incorporated by reference.

BACKGROUND OF THE INVENTION

1. Field of the Invention

The present invention relates to an image processing device and a computer-readable medium storing a program.

2. Description of the Related Art

In a case where an application is installed in an image processing device capable of newly installing the application including a plurality of functions, when the application operates in the image processing device, the relevant application often calls an API (Application Programming Interface) for utilizing a prepared function of the image processing device. In such a case, a configuration in which an available API is restricted is disclosed in US2006/0287962A1.

When an available API and an unavailable API exist together, although a case where unavailability of an API disables an application to be executed may occur, a user cannot know it until he or she actually operates the application. Thus, there is a problem in that, seen from the user's viewpoint, it may be recognized by mistake as a trouble that the application does not operate properly.

SUMMARY OF THE INVENTION

Therefore, an object of the present invention is to provide an image processing device capable of easily determining whether or not an application is executable based on whether or not an API is available, and a computer-readable medium storing a program.

An image processing device according to an aspect of this invention comprises an application acquiring unit for acquiring an application program including a plurality of functions, an information acquiring unit for acquiring an information on a relation between the plurality of functions and application programming interfaces (APIs) which each of the plurality of functions is able to call, a determining unit for determining whether or not the APIs are available to said functions, and an indicating unit for indicating to a user unexecutability of the function due to unavailability of the APIs to the function when the determining unit determines the APIs are not available to the function.

Preferably, the indicating unit indicates to the user that the application is unexecutable when all of the plurality of functions are unexecutable.

Preferably, the determining unit determines whether or not the APIs are available to the functions by referring to information on the user logging into the image processing device.

Preferably, the determining unit determines whether or not the APIs are available to the functions by referring to information on the image processing device.

More preferably, the information on the image processing device includes information on a content set to the image processing device.

Furthermore, more preferably, the information on the image processing device includes information on a state of the image processing device.

Preferably, the information acquiring unit externally acquires a file retaining the information on the relation.

Preferably, the indicating unit switches an indication way between a case where the application is executable and a case where part of the functions are unavailable.

According to another aspect of this invention, there is provided a computer-readable medium storing a program, the program being installed in an image processing device including a processor to make the processor execute processing of acquiring an application program including a plurality of functions, processing of acquiring an information on a relation between the plurality of functions and application programming interfaces (APIs) which each of the plurality of functions is able to call, processing of determining whether or not the APIs are available to the function, and processing of indicating to a user unexecutability of the function due to unavailability of the APIs to the function when the determining unit determines the APIs are not available to the function.

According to the image processing device of the present invention, execution validity or invalidity of the application due to whether or not the API is available can be easily determined.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, referring to the drawings, an embodiment of the present invention is described.

1. Configuration of Network System

Figure 1:
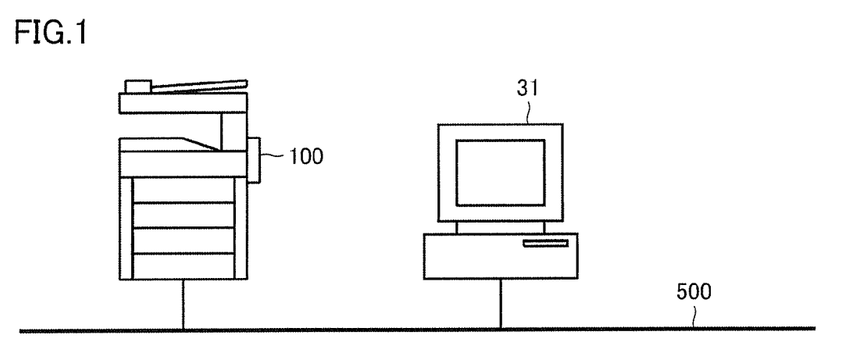
FIG. 1 is a diagram showing one example of a configuration of a network system in the present embodiment.

FIG. 1 is a diagram showing one example of a configuration of a network system in the present embodiment. In the present embodiment, a configuration is such that MFP (Multi Function Peripheral) 100 and a PC 31 are connected through a network 500 such as a LAN, and that an application operating on MFP 100 can be downloaded from PC 31. In MFP 100, various APIs are installed in advance, and the downloaded application calls the relevant API to realize a function of the application.

2. Configuration of MFP 100

Figure 2:
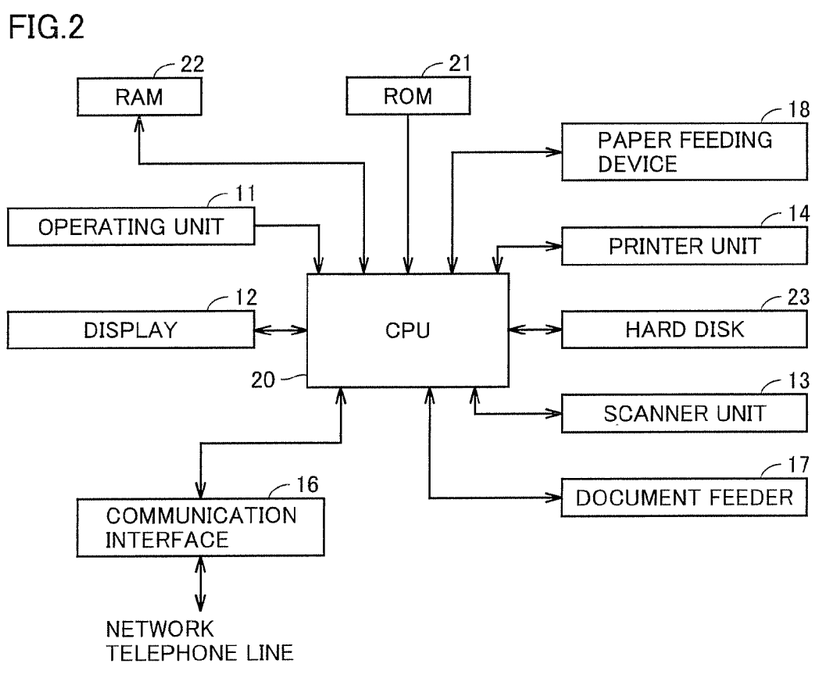
FIG. 2 is a diagram showing one example of a hardware configuration of an MFP 100.

Next, a configuration of MFP 100 is described. FIG. 2 is a diagram showing one example of a hardware configuration of MFP 100.

MFP 100 comprises an operating unit 11, a display 12, a scanner unit 13, a printer unit 14, a communication interface 16, a document feeder 17, a paper feeding device 18, a CPU 20, a ROM 21, a RAM 22, a hard disk 23 and the like.

Operating unit 11 includes a plurality of keys for inputting numeral characters, letters, signs and the like, a sensor that recognizes a pressed key, a transmission circuit that transmits a signal indicating the recognized key to CPU 20, and the like.

Display 12 displays a screen that displays a message to a user, a screen for the user to input setting contents and processing contents, a screen showing a result of processing executed in MFP 100, and the like. In the present embodiment, a touch panel making up part of operating unit 11 is provided on display 12. The touch panel has a function of sensing a position on the touch panel that the user has touched with his or her finger, and transmitting a signal indicating a sensing result to CPU 20.

Scanner unit 13 reads an image drawn in a manuscript with a predetermined reading resolution by irradiating the manuscript with light to detect reflected light, and generates digital image data (in this case, concentration data indicating concentrations of RGB or black).

The obtained image data is used for printing in printer unit 14, and in addition, is converted into a file in a format of TIFF, PDF, JPEG and the like to be stored in hard disk 23. It may be also converted into FAX data to be FAX-transmitted. Moreover, as described before, it may be attached to a mail to be transmitted outside. Document feeder 17 is provided, for example, on the top of a body of MFP 100, and is used to feed one or a plurality of sheets of manuscript to scanner unit 13 sequentially.

Printer unit 14 prints an image read in scanner unit 13, an image of data transmitted from an external device such as another MFP, which is connected through the network such as a LAN, or an image of FAX data received over FAX on a recording sheet such as paper or a film.

Paper feeding device 18 is provided, for example, in the bottom of the MFP 100 body, and is used to supply the recording sheet to printer unit 14. The recording sheet on which the image is printed by printer unit 14 is discharged, for example, onto a catch tray.

Communication interface 16 is an interface for performing communication with an external device such as PC 31 and a mail server 33 through the network such as the LAN and a WAN, or performing FAX transmission and reception through a telephone line. As communication interface 16, for example, an NIC (Network Interface Card), a TA (Terminal Adapter) and the like can be used.

In ROM 21, programs and data for realizing reading of an image (scanning), copying of a manuscript, transmission and reception of FAX data, network printing, and basic functions of MFP 100 such as a document server (box function) are stored. In addition, programs and data that realize the functions of the present embodiment are stored.

A part or whole of these programs or data may also be installed in hard disk 23 in advance. In this case, the programs and data installed in hard disk 23 are loaded on RAM 22 as necessary.

The functions described in the present embodiment can also be realized by using not only CPU 20 but also a dedicated hardware, or part of them can also be realized by utilizing a function of a general-purpose program of an operating system (OS) and the like.

Figure 3:
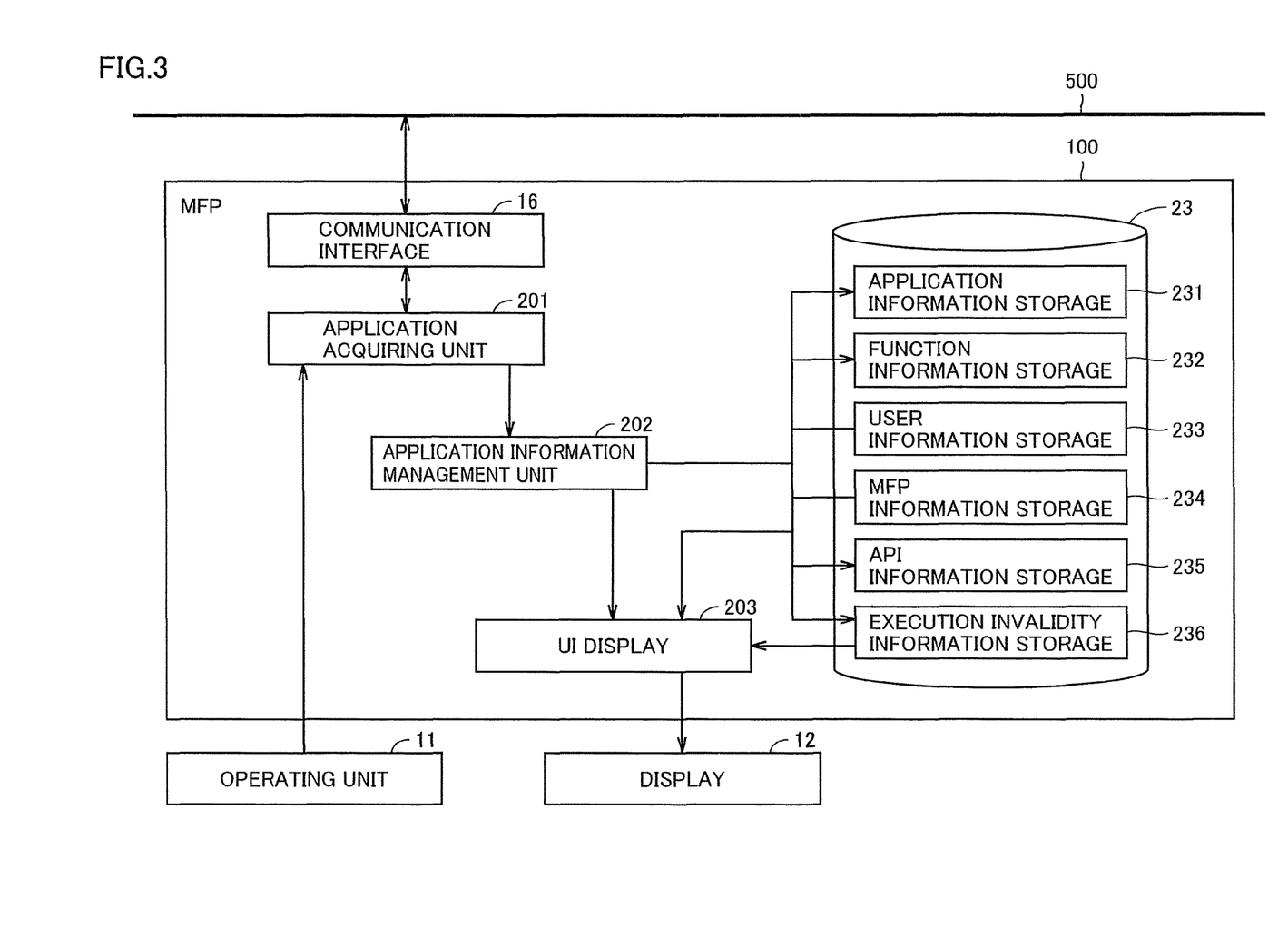
FIG. 3 is a block diagram for explaining one example of a functional configuration of MFP 100 of the present embodiment.

FIG. 3 is a block diagram for explaining one example of a functional configuration of MFP 100 of the present embodiment. MFP 100 comprises an application acquiring unit 201, an application information management unit 202, and a UI display 203. Functions of these respective units are realized by the programs stored in ROM 21 and RAM 22 being operated on CPU 20. Hard disk 23 includes application information storage 231, a function information storage 232, user information storage 233, MFP information storage 234, API information storage 235, and execution invalidity information storage 236.

As to corresponding relations between FIG. 3 and the present invention, application acquiring unit 201 corresponds to an "application acquiring unit", application information management unit 202 corresponds to an "information acquiring unit" and "determining unit", and UI display 203 and display 12 correspond to an "indicating unit".

Application acquiring unit 201 downloads an application from PC 31 to install in MFP 100. The installed application calls the API prepared in MFP 100 to realize the function.

Application information management unit 202 manages various types of information on the application stored in hard disk 23. UI display 203 controls display contents of user interface screens onto display 12.

Figure 4:
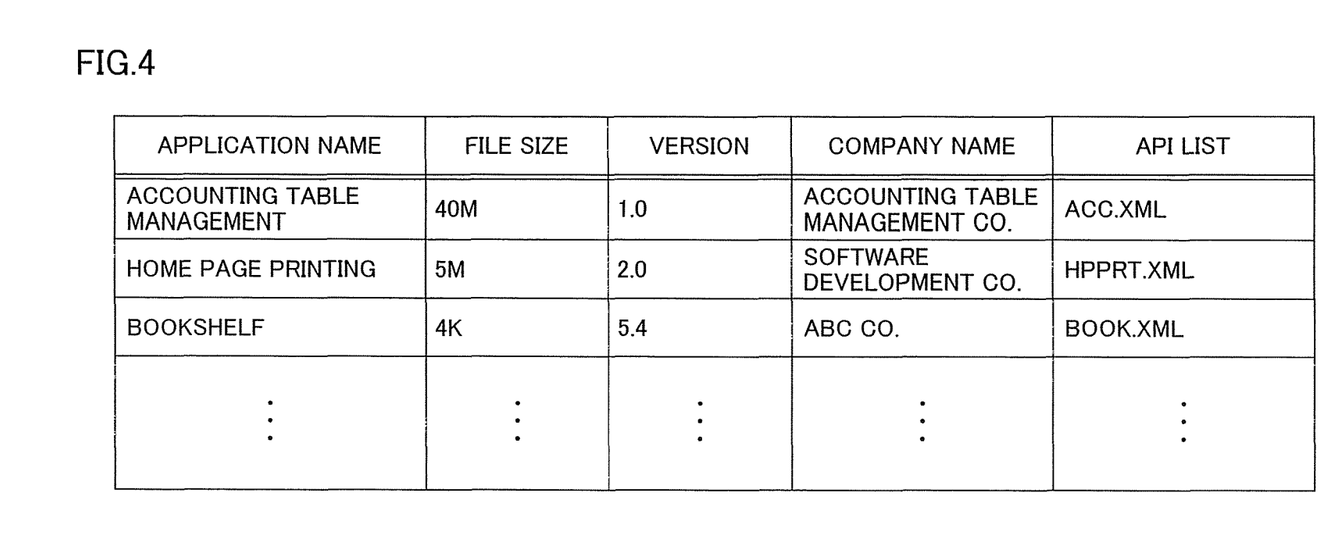
FIG. 4 is a diagram showing one example of contents of application information stored in an application information storage 231.

FIG. 4 is a diagram showing one example of contents of application information stored in application information storage 231. In the present embodiment, as the application information, an application name, a file size, a version, a name of a company selling the application, and a file name of an API list defining the API used in the relevant application are stored. Obviously, the stored contents are not limited to these, and also, for example, an installation date and time, a necessary digital certificate and the like can be stored together.

Figure 5:
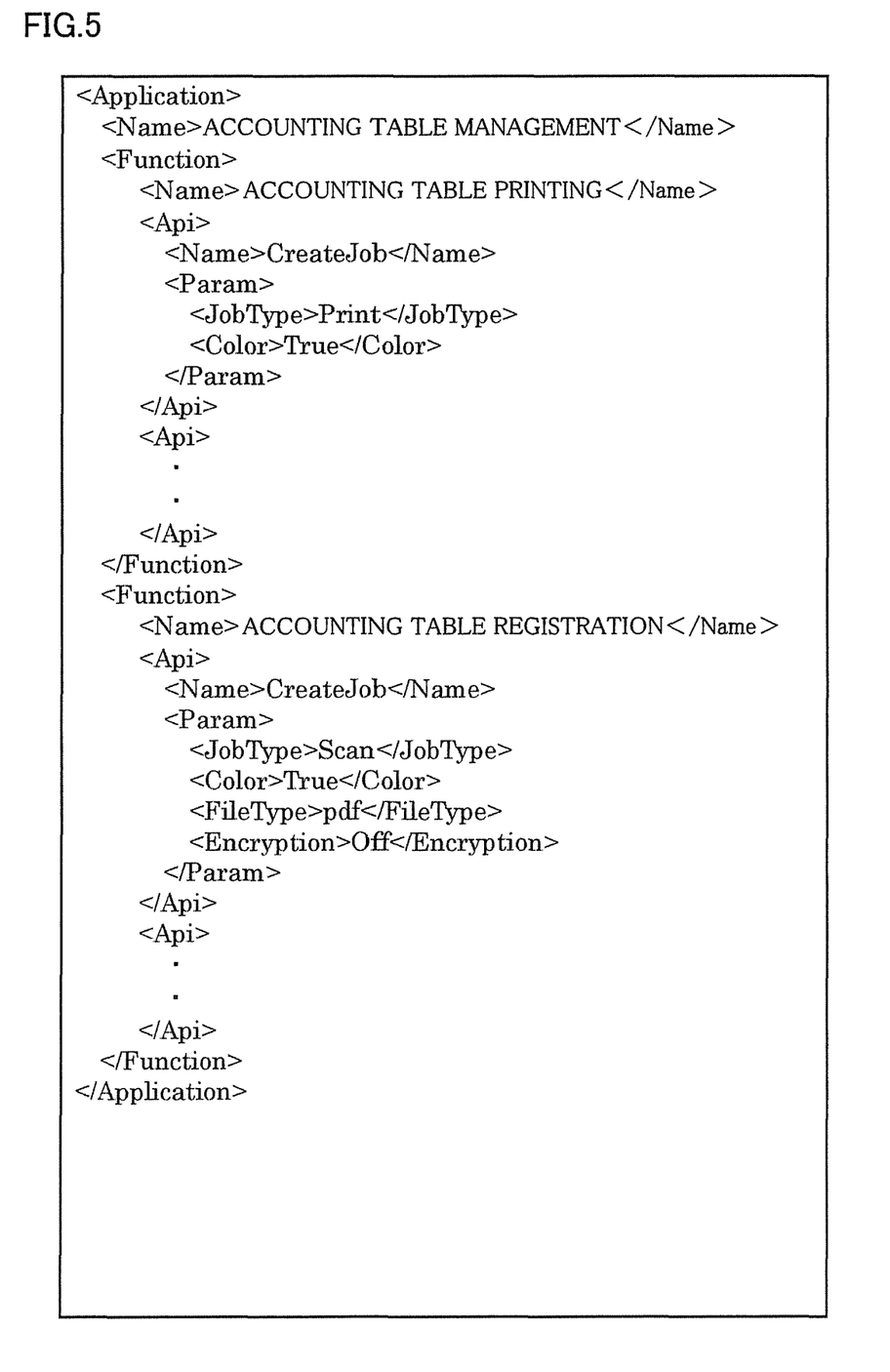
FIG. 5 is a diagram showing one example of contents of a file of an API list.

The above-described file of the API list is stored in function information storage 232 as a file in an XML format in the present embodiment. FIG. 5 is a diagram showing one example of contents of the file of the API list, and for each application, a plurality of functions and the API called for realizing the relevant function are defined. In the example of this figure and a function of "accounting table printing" and a function of "accounting table registration" are illustrated, and the API called when each of the functions is utilized is described. This API list can be prepared in advance, and be acquired, for example, from a download destination when the application is downloaded.

Figure 6:
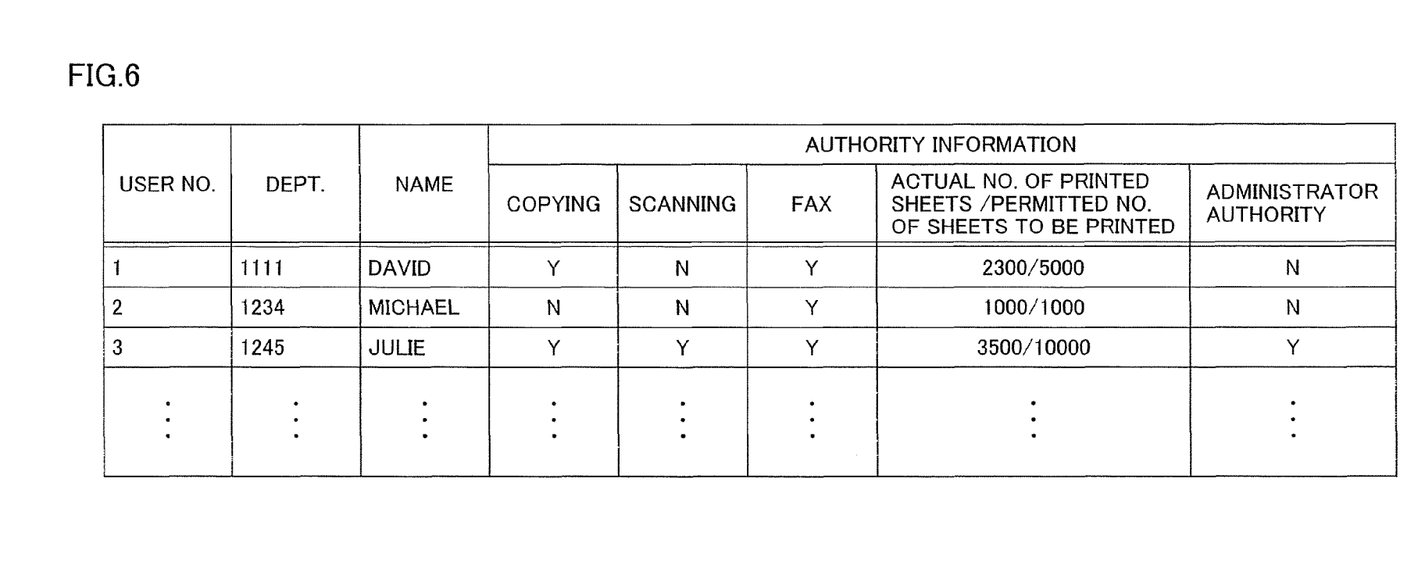
FIG. 6 is a diagram showing one example of contents of user information stored in a user information storage 233.

FIG. 6 is a diagram showing one example of contents of user information stored in user information storage 233. In the present embodiment, a user number given to each user, a department, a name, and authority information on each user are retained. In the present embodiment, as the authority information, the presence or absence of authority to utilize the respective functions of copying, scanning and FAX, the upper limit of the number of sheets to be printed and the actual number of printed sheets, and the presence or absence of administrator authority are stored. The actual number of printed sheets is updated almost at real time. Moreover, when the upper limit of the number of sheets to be printed is set on a monthly basis, "the actual number of printed sheets" is reset at the beginning of the next month, and then the counting-up is continued. The authority information is limited to these, but the presence or absence of authority to utilize other functions (for example, box creation) can also be included.

Figure 7A:
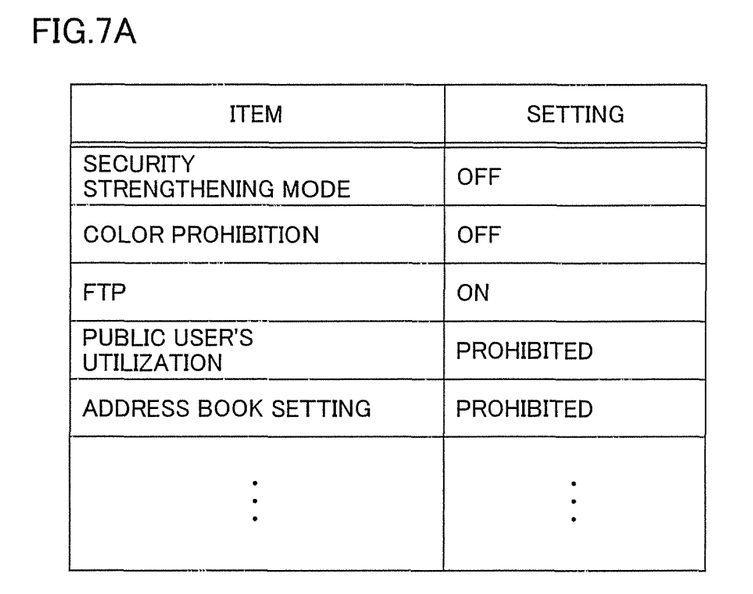
FIGS. 7A and 7B are diagrams showing one example of contents of MFP information stored in an MFP information storage 234.
Figure 7B:
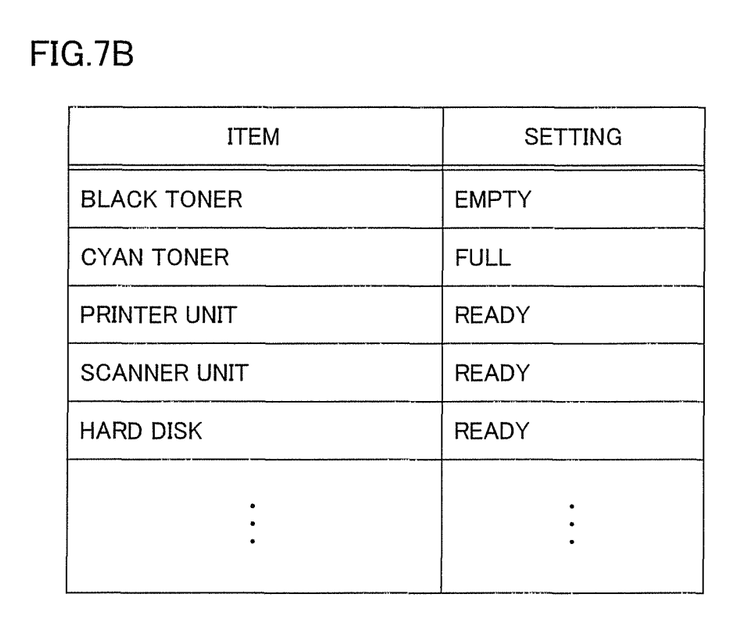

FIGS. 7A and 7B are diagrams showing one example of contents of MFP information stored in MFP information storage 234. In the present embodiment, as the MFP information, there are MFP setting information shown in FIG. 7A and MFP state information shown in FIG. 7B. The MFP state information changes dynamically.

Figure 8A:
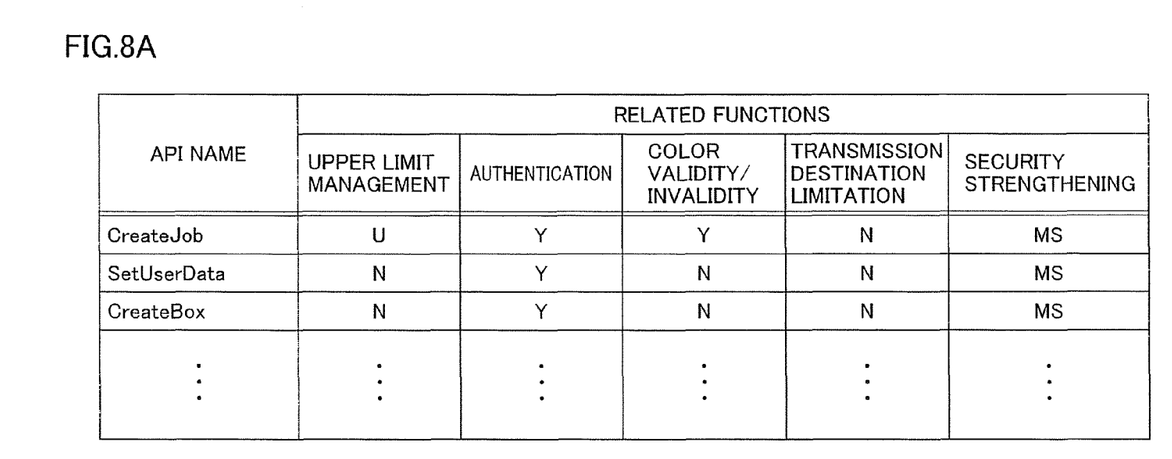
FIGS. 8A and 8B are diagrams showing one example of contents of API information stored in an API information storage 235.
Figure 8B:
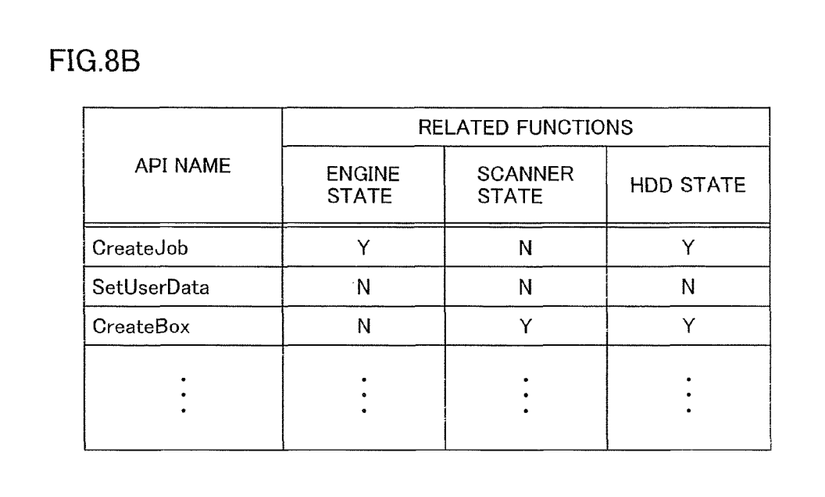

FIGS. 8A and 8B are diagrams showing one example of contents of API information stored in API information storage 235. As the API information, there are API related function information shown in FIG. 8A and API related state information shown in FIG. 8B. The API related function information indicates related functions of each API.

In FIGS. 8A and 8B, "Y" indicates that the relevant API is related to each of the functions, and "N" indicates no relation. Moreover, a case where "U" is set means that whether or not the API is available is determined with reference to the user information. Since the upper limit of the number of sheets to be printed varies depending on the user, "U" is set. Moreover, a case where "MS" is set means that whether or not the API is available is determined with reference to the MFP setting information (in the example of FIG. 7A, "setting of security strengthening mode").

The API related state information indicates a related state (state of the MFP). for each API. For example, it is indicated that for determination as to whether or not an API "Create-Box" is available, a state of the hard disk is referred to. Obviously, the API related function information and the API related state information are not limited to the items defined above.

Execution invalidity information storage 236 stores information on the unavailable API, the functions of the application which cannot be executed due to unavailability of the API, and the like from the information on the respective units described above. This execution invalidity information will be described in detail later.

3. Processing Contents of MFP 100

Figure 9:
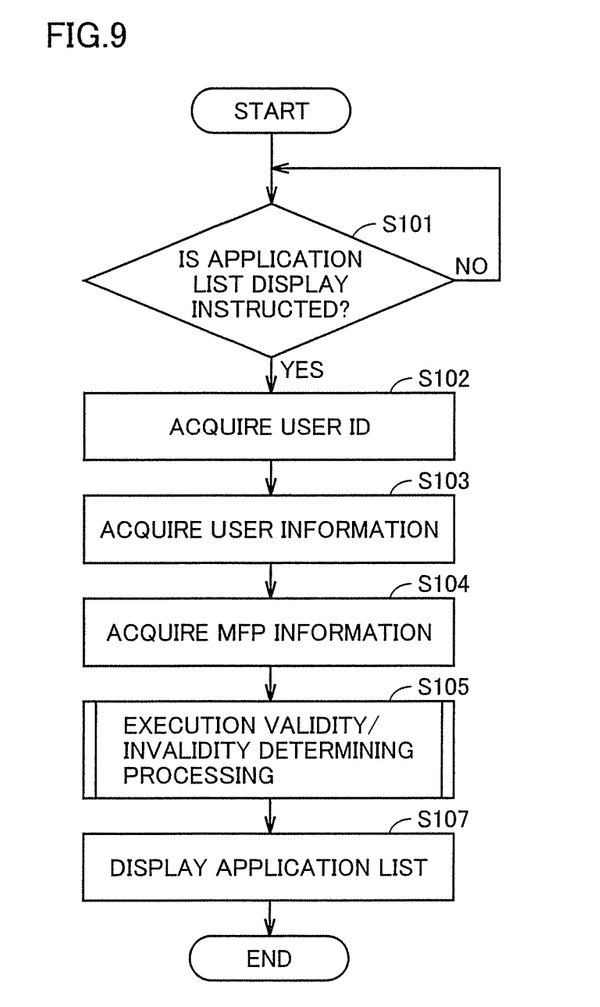
FIG. 9 is a flowchart for explaining one example of processing contents of MFP 100.

Hereinafter, the processing contents of MFP 100 of the present embodiment are described. FIG. 9 is a flowchart for explaining one example of the processing contents of MFP 100. The processing explained by the flowchart in the present embodiment is realized by CPU 20 executing a program corresponding to the processing.

When the list display of the applications is instructed (S101: YES), CPU 20 first acquires a user ID of a user logging into MFP 100 at this point, (S102). There is possibility that the user using MFP 100 has not passed through user authentication, and in this case, for example, a user ID that any user can use such as "Guest" can be given in advance.

Next, referring to the contents of user information storage 233, CPU 20 acquires the user information (S103). The user information can be registered in user information storage 233 in advance through operating unit 11 or the like. Next, the CPU 20 acquires the MFP information stored in MFP information storage 234 (S104). Then, CPU 20 performs execution validity/invalidity determining processing (S105).

Figure 10:
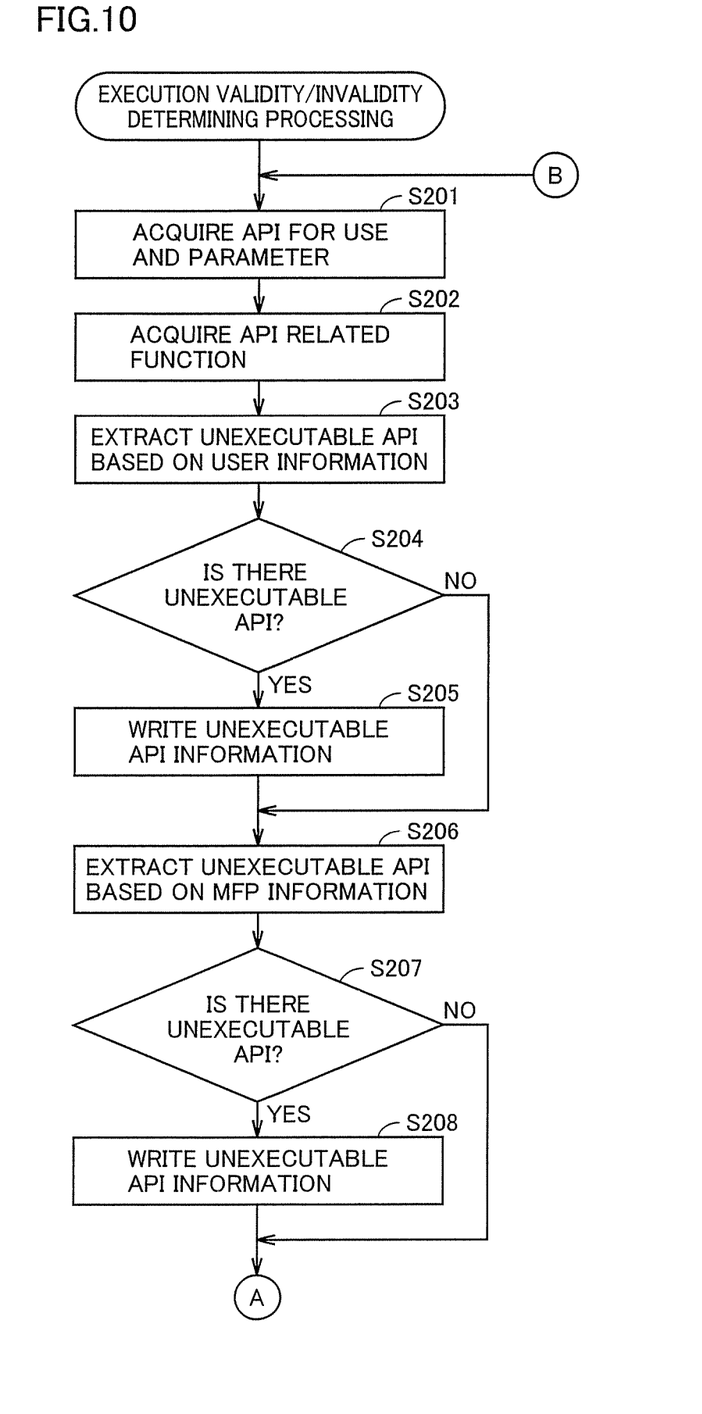
FIG. 10 is a flowchart for explaining one example of contents of execution validity/invalidity determining processing.

FIG. 10 is a flowchart for explaining one example of contents of the execution validity/invalidity determining processing. The execution validity/invalidity determining processing is processing in which availability of each API is determined, and the execution validity/invalidity of a plurality of functions that the application finally calling the relevant API includes (in a case of the application "accounting table management", the functions are "accounting table printing", "accounting table registration" and the like) is determined.

In the execution validity/invalidity determining processing, CPU 20 first acquires the API to be used and parameter setting for each application (S201). This information acquisition can be performed with reference to the contents of the file (in the XML format as one example in the present embodiment) of the API list illustrated in FIG. 5.

CPU 20 then acquires API related functions (S202). In this case, the API related functions are functions described in <Function> tags in the API list of FIG. 5. As shown in FIG. 5, since the API to be called is associated with the related functions, the related functions can be acquired from the API acquired in step S201.

Next, referring to the user information illustrated in FIG. 6, and the API related function information and the API related, state information illustrated in FIG. 8, CPU 20 extracts the unexecutable API based on the user information (S203). For example, in the API "CreateJob" in FIGS. 8A and 8B, since "U" is set for the upper limit management in the API related function information, with reference to the user information, if it is found that the actual number of printed sheets which is retained as the user information has reached the upper limit, the relevant user can no longer execute printing processing. Thus, the API "CreateJob" is unavailable.

Figure 11A:
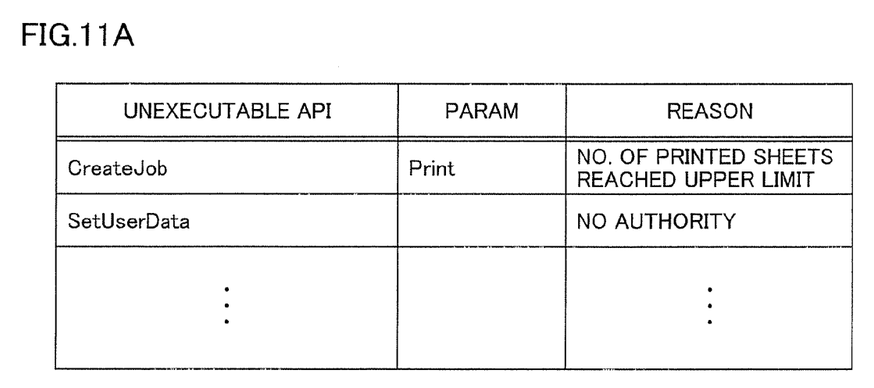
FIGS. 11A and 11B are diagrams for explaining one example of contents of an execution invalidity information storage 236.
Figure 11B:
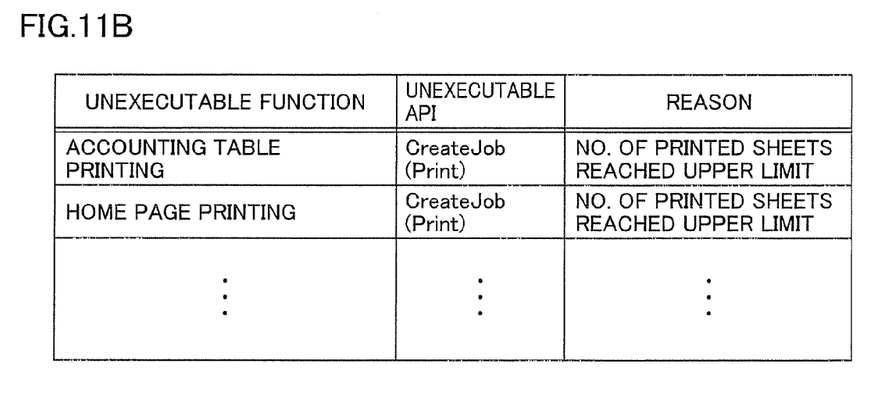

Moreover, for "CreateBox", referring to the API related state information, since it is found that the scanner state is related, if the user is not given scanner authority, the relevant API is also unavailable. If after the unexecutable API is extracted in this manner, some unexecutable API is found to exist (S204: YES), CPU 20 writes the execution invalidity information into execution invalidity information storage 236 (S205). FIGS. 11A and 11B are diagrams for explaining one example of the contents of execution invalidity information storage 236.

In execution invalidity information storage 236, unexecutable API information as shown in FIG. 11A, and unexecutable function information as shown in FIG. 11B are stored. In the above-described step S205, the unexecutable API information is written. In the present embodiment, at this time, a reason for execution invalidity (e.g., "the number of printed sheets reached the upper limit") is stored together. This reason is utilized for execution validity/invalidity indication to the user by the display onto display 12 as will be described later.

Next, the extraction of the unexecutable API based on the MFP information is performed (S206). As illustrated in FIGS. 7A and 7B, the MFP information includes the MFP setting information and the MFP state information, and in this case, referring to both of them, the unexecutable API is extracted. For example, if address book setting is prohibited, the API performing the address book setting cannot be executed, and if a state of hard disk 23 is not ready, the API accessing the hard disk cannot be executed. Thus, also referring to the MFP state, the unexecutable API is extracted.

If there exists any unexecutable API based on the MFP information (S207: YES), CPU 20 writes the unexecutable API information into execution invalidity information storage 236 as in step S205 (S208). The processing goes to a flowchart of FIG. 12, and when the extraction of all the unexecutable APIs is finished (S209: YES), CPU 20 extracts an unexecutable function due to the existence of the unexecutable API (S210).

Figure 12:
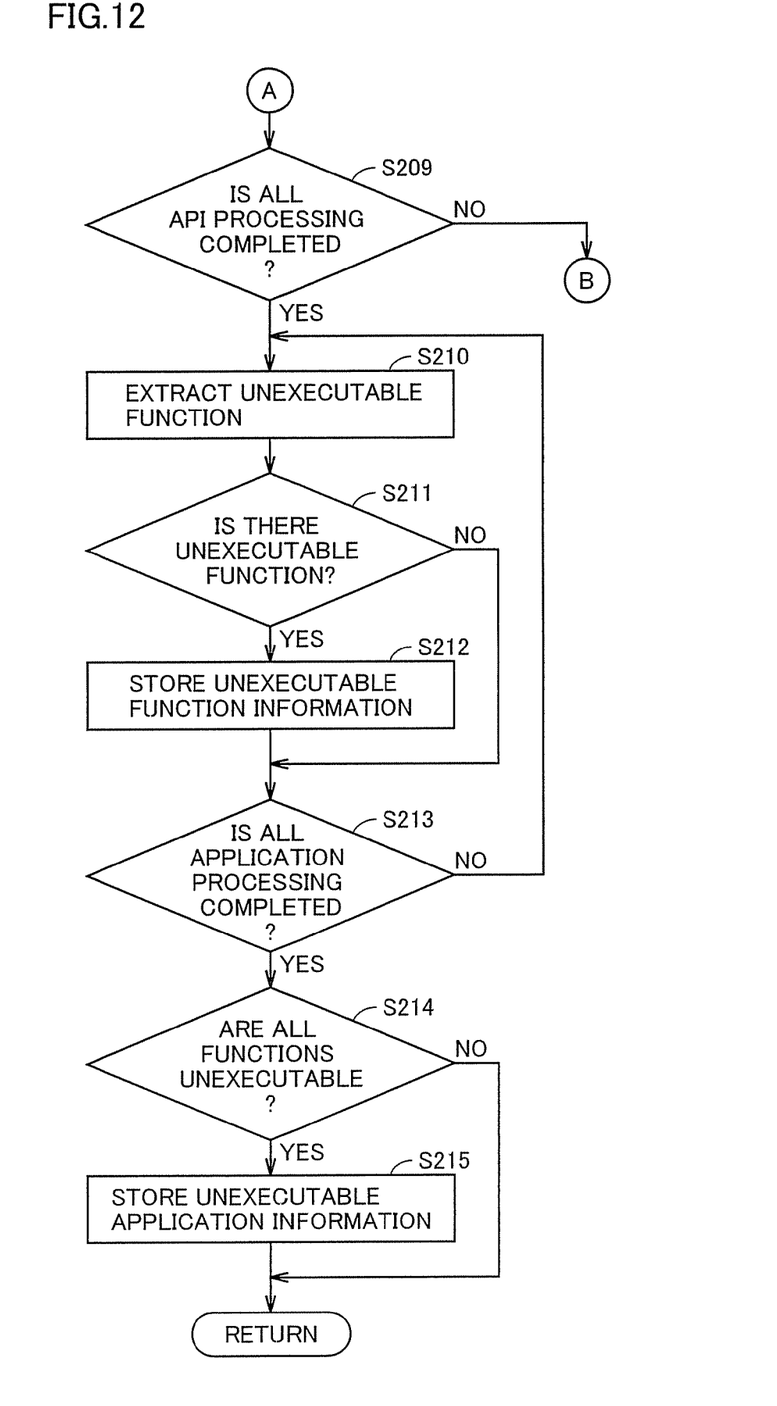
FIG. 12 is a flowchart for explaining one example of contents of execution validity/invalidity determining processing.

If there exists any unexecutable function (S211: YES), CPU 20 writes the unexecutable function information into execution invalidity information storage 236 (S212). As a result, the unexecutable function information as illustrated in FIG. 11B is written.

When, for all the applications whose application information as illustrated in FIG. 4 is registered, the extraction of the unexecutable functions is finished (S213: YES), CPU 20 determines whether or not an application all the functions of which are unexecutable exists (S214). If there exists any application all the functions of which are unexecutable (S214: YES), CPU 20 registers the relevant application as the unexecutable application (S215). This processing is also enabled, for example, in a form of setting an execution invalidity flag in the table of FIG. 4.

Figure 13:
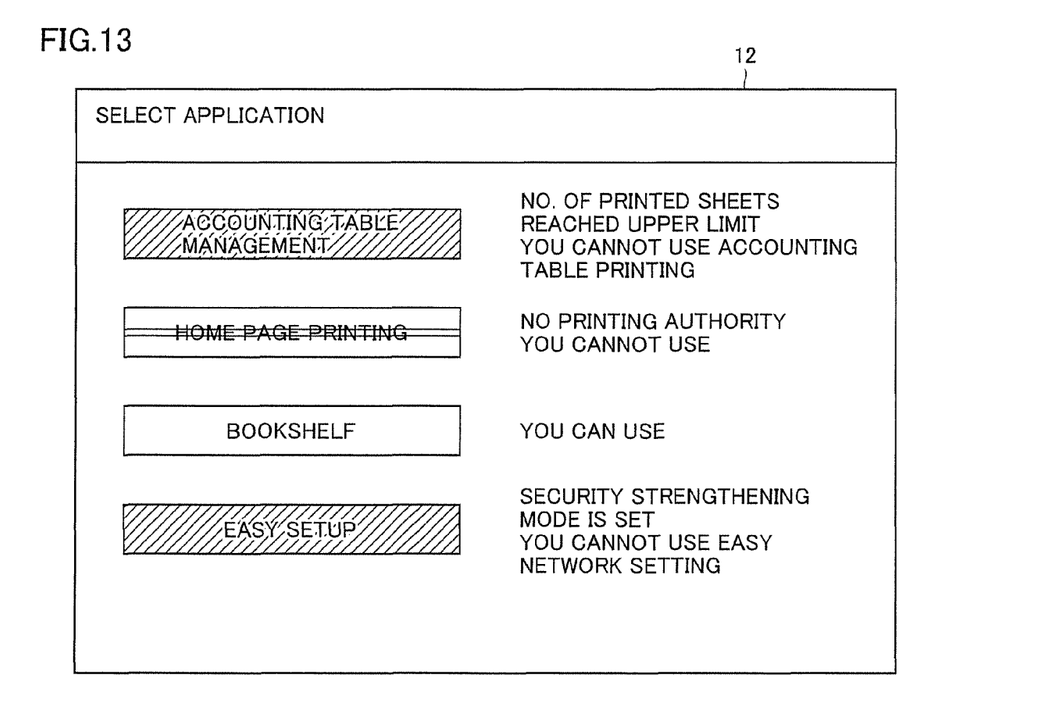
FIG. 13 is a diagram showing one example of a state where a list of applications is displayed.

As described above, the execution validity/invalidity determining processing is finished, and CPU 20 returns to the processing in the flowchart of FIG. 9 to perform the application list display (S107). In this processing, the list of the applications is displayed on display 12. FIG. 13 is a diagram showing one example of a state where the list of the applications is displayed.

As shown in this figure, in the application list display of the present embodiment, for the application all the functions of which are executable (in the example of this figure, "bookshelf"), the application part of the functions of which are unexecutable (in the example of this figure, "accounting table management, and "easy setup"), and the application all the functions of which are unexecutable (in the example of this figure, "home page printing"), a way of the display is switched and the unexecutable functions are indicated. This switching of the display can be performed with reference to the unexecutable function information. The application all the functions of which are unexecutable in FIG. 13 is preferably configured so as not to be activated even when a relevant button is pressed, and may be configured such that the relevant button itself is not displayed.

As described above, according to the present embodiment, in the application list display, since not only the application which is unexecutable is displayed in such an unselectable manner, but also it can be easily identified that the functions which cannot be executed due to unavailability of the API exist, a situation can be prevented from occurring, for example, in which even if the user attempts to activate the function during operating the application, the function does not operate, so that the user has trouble addressing this. Moreover, the determination as to whether or not the API is available can be performed while reflecting the dynamically changing state, so that fixed setting values need not be reset each time.

(Modification)

While the embodiment of the present invention has been described above, it is obvious that the contents of the present invention are not limited by the specific examples explained in the above embodiment, and for example, the following modification can be also carried out.

Namely, while in the above-described embodiment, a case where the application is installed from PC 31 has been described, the installation of the application can also be executed from a CD-ROM, a DVD-ROM, a USB memory, and other various media, and in any case, the present invention can be applied.

Moreover, while in the above-described embodiment, the execution validity/invalidity determining processing is performed when the application list display is instructed, the execution validity/invalidity determining processing may be performed as needed after the application is launched. In this case, more precise execution validity/invalidity determination against the dynamic state change can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device comprising:
    an application acquiring unit for acquiring a particular application program including a plurality of functions;
    an information storage device for storing (i) setting information pertaining to the image processing device that is set in advance and (ii) state information pertaining to the image processing device that changes dynamically;
    an information acquiring unit for acquiring information regarding a relation between said plurality of functions of said acquired application program and a plurality of application programming interfaces (APIs) for controlling each function of the plurality of functions of the particular application;
    a determining unit configured to (i) determine the availability of each API from said plurality of APIs based on said stored setting and state information, and (ii) determine each unexecutable function, when at least one API is determined to be unavailable, based on at least said acquired relation information;
    an extraction unit for extracting any of said plurality of APIs that are determined to be unavailable to said plurality of functions based on the information stored in said information storage unit; and
    an indicating unit for indicating, to a user, at least one function, from the plurality of functions being unexecutable due to the unavailability of at least one API related to the at least one function when said determining unit determines that the at least one API from said plurality of APIs is not available to the at least one function or when said extraction unit extracts the at least one API from said plurality of APIs as being unavailable to the at least one function.

2. The image processing device according to claim 1, wherein said indicating unit indicates to the user that the application program is unexecutable when each function from said plurality of functions is unexecutable.

3. The image processing device according to claim 1, wherein said determining unit determines whether said APIs are available to said plurality of functions by referring to information regarding the user logging into the image processing device.

4. The image processing device according to claim 1, wherein said information acquiring unit externally acquires a file retaining the information on said relation.

5. The image processing device according to claim 1, wherein said indicating unit switches an indication from indicating that the application program is executable to indicating that at least one of the functions from the plurality of functions is unavailable when said at least one function becomes unavailable.

6. The image processing device according to claim 1, wherein indicating unit further indicates, to the user, a reason why an API of a related function is unavailable prior to operating said application program.

7. A non-transitory computer-readable storage medium storing a program, said program being installed in an image processing device including a processor and causing said processor to execute:
    processing of acquiring an application program including a plurality of functions;

storing, in an information storage device, (i) setting information of the image processing device that is set in advance and (ii) state information of the image processing device that changes dynamically;

processing of acquiring information regarding a relation between said plurality of functions of said acquired application program and the plurality of application programming interfaces (APIs) for controlling each function of the plurality of functions of the particular program;

processing of (i) determining an availability of each API from said plurality of APIs based on said stored setting and state information, and (ii) determining each unexecutable function, when at least one API is determined to be unavailable, based on said acquired relation information;

extracting any of said plurality of APIs that are determined to be unavailable to said plurality of functions based on the information stored in said information storage unit; and processing of indicating to a user at least one function from the plurality of functions being unexecutable due to the unavailability of at least one API related to the at least one function from the plurality of functions when said determining unit determines that the at least one API from said plurality of APIs is not available to the at least one function or when said extraction unit extracts the at least one API from said plurality of APIs as unavailable to the at least one function.

8. The non-transitory computer-readable storage medium according to claim 7, wherein said processing of indicating includes indicating to said user that the application program is unexecutable when each function from said plurality of functions is unexecutable.

9. The non-transitory computer-readable medium according to claim 7, wherein processing of determining whether said APIs are available to said plurality of functions includes referring to information regarding the user logging into the image processing device.

10. The non-transitory computer-readable medium according to claim 7, wherein said processing of acquiring information includes externally acquiring a file retaining the information on said relation.

11. The non-transitory computer-readable medium according to claim 7, wherein said processing of indicating includes switching an indication from indicating that the application program is executable to indicating that at least one of the functions from the plurality of functions is unavailable when said at least one function becomes unavailable.

12. The non-transitory computer-readable medium according to claim 7, wherein said processing of indicating further includes indicating, to the user, a reason why an API of a related function is unavailable prior to operating said application program.

* * * * *